May 16, 1961 W. A. COBURN 2,984,117
SPEED CHANGE TRANSMISSION MECHANISM
Filed Feb. 23, 1960 4 Sheets-Sheet 1

Inventor
Wallace A. Coburn
By Stevens Davis Miller & Mosher
Attorneys

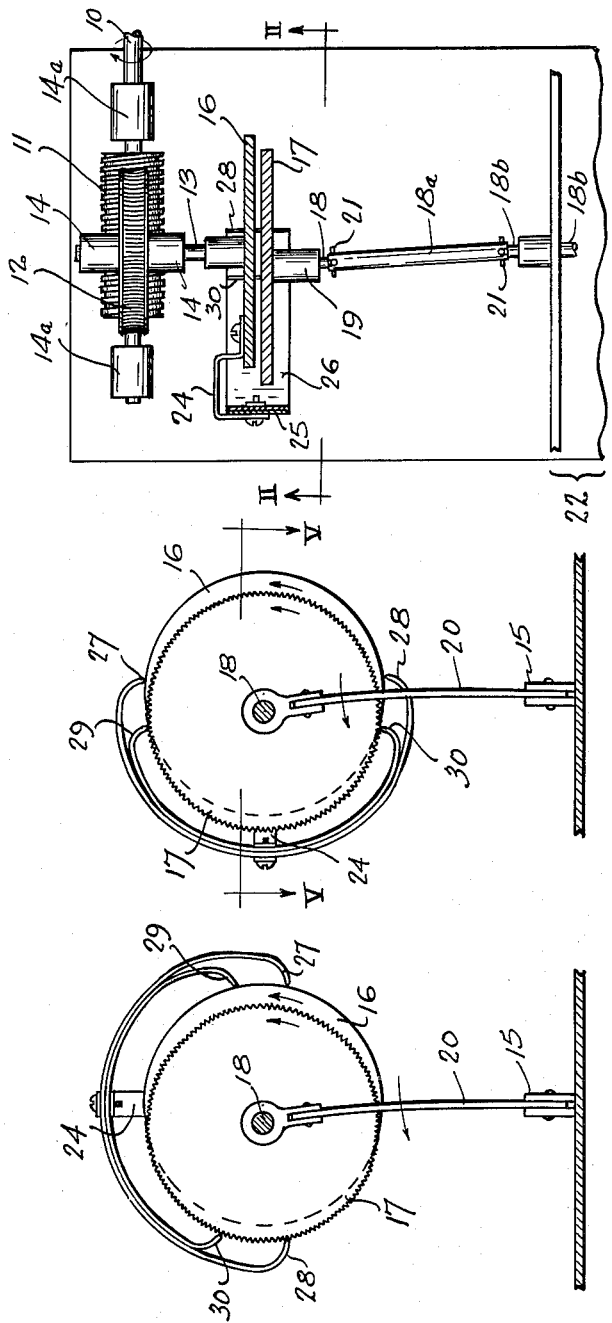

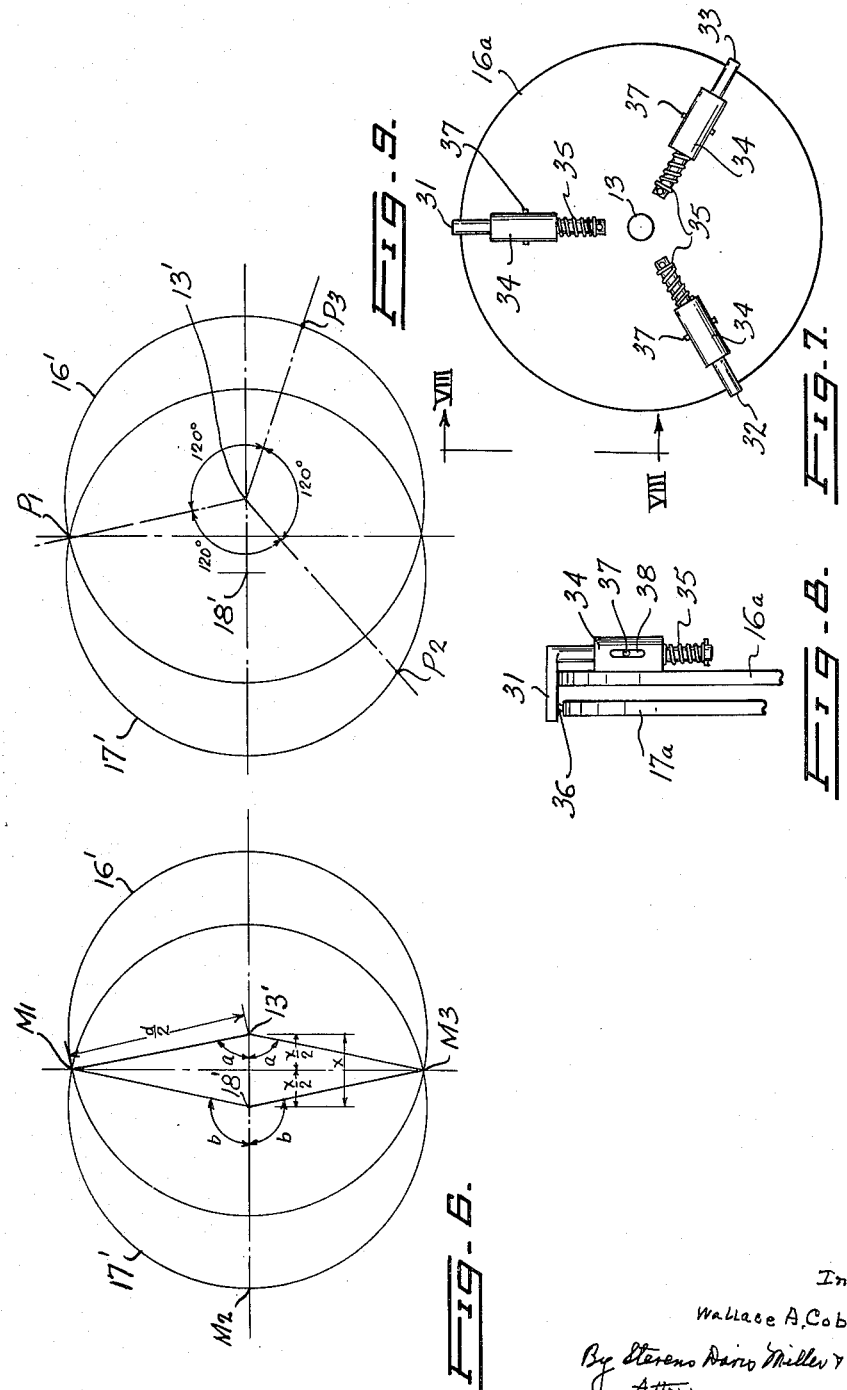

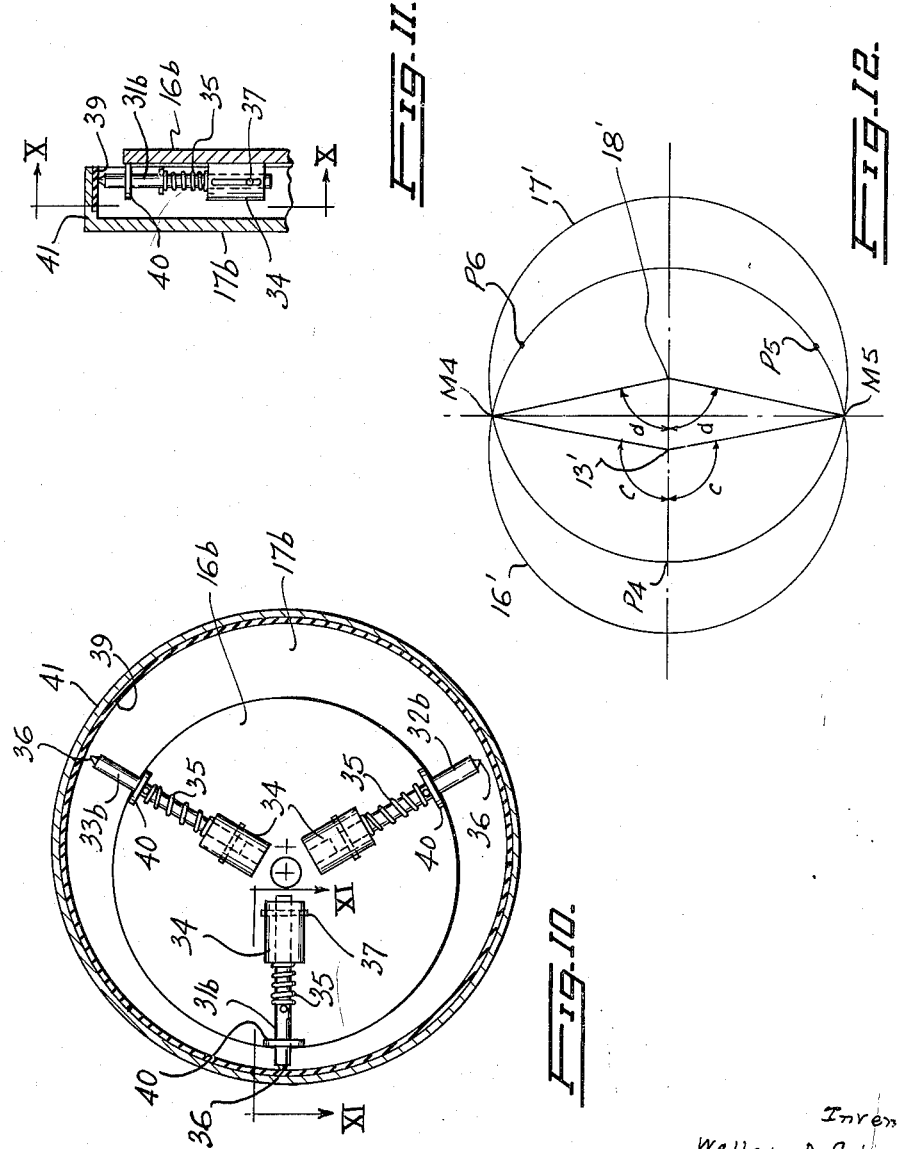

United States Patent Office 2,984,117
Patented May 16, 1961

2,984,117
SPEED CHANGE TRANSMISSION MECHANISM

Wallace A. Coburn, 310 21st St., Brandon, Manitoba, Canada

Filed Feb. 23, 1960, Ser. No. 10,327

Claims priority, application Canada Feb. 2, 1960

13 Claims. (Cl. 74—117)

This invention relates to a speed change transmission mechanism for producing a closely controlled speed ratio between a pair of shafts, and particularly in circumstances where the speed change ratio concerned represents only a comparatively small deviation from unity.

One application to which the invention is especially well adapted is the compensation of metering devices to take into account external variables, such as temperature, and the invention will therefore be exemplified below in relation to its use as a temperature compensating device for use in a meter. It will be apparent, however, that the mechanism which is the subject of the true inventive advance is equally applicable to the transmission of rotation between any two shafts between which a carefully controlled speed change is to be obtained, whether said shafts form part of a metering mechanism or not.

Gas meters as presently constructed usually consist of expansible bellows or like devices that serve to measure the volume of gas flowing through the meter. Gas flows into the meter until one set of bellows is fully expanded, after which by suitable valves it is arranged that this gas continues on into the customer's premises with corresponding deflation of this set of bellows, while a separate set of bellows is inflated by a fresh amount of gas. The recording portion of the meter, which counts the number of times each set of bellows is inflated and deflated, is thus sensitive purely to the volume of gas that passes through the meter, no account being taken of the pressure of this gas above atmospheric pressure, or of its temperature. Other, more complicated types of gas meters are known, but those in common use are still essentially of this volumetric displacement character.

This measurement by volume gives rise to inaccuracies in gas metering, because ideally the meter should record the mass of gas that flows into the consumers' premises, since the quantity of energy which he receives is directly proportional to the mass of gas, assuming the composition of the gas to remain constant. The mass of gas is related to the volume of gas in accordance with its density, and thus if the density could be kept constant, a volumetric measurement would be equivalent to a mass measurement. The density of the gas is dependent upon two factors—the temperature, and the pressure. In the past it has been customary to arrange for a gas regulator to reduce the pressure at which the gas flows into the gas meter to a fixed predetermined value. Thus the pressure is fixed, but the temperature still remains as a variable, which can lead to mass measurement errors up to as much as 11% for approximately 60° F. temperature change.

To provide for this difficulty, proposals have been made to compensate a gas meter in accordance with the temperature of the gas which is flowing through it. Thus, if the meter is set to be correct at a temperature of say 60° F. (which is conventionally taken as a base measurement in gas metering calculations and approximates to a common gas temperature during summer), the meter will tend to read about 6% low as far as the mass of gas delivered is concerned (assuming it always reads correctly volumetrically) when the temperature falls to say 30° F. Under severe winter conditions, the gas temperature may fall far below 30° F. One way of compensating for this type of error would be to increase the ratio of transmission between the bellows mechanism and the counter as the temperature falls. If this is done, the counter will read high as far as volume is concerned and will truly indicate the mass of gas flow. As heretofore the pressure is assumed to remain constant.

It is thus one object of the present invention to provide a change speed transmission mechanism suitable for use in a gas meter for transmitting motion from a volumetric measuring device (e.g. the bellows) to the counter (e.g. the recording dials) in which the transmission ratio can be varied in fine, closely controlled steps between unity and a value not deviating substantially from unity, say up to ten or perhaps even fifteen percent. If any large change of ratio is required this will be furnished by means of fixed gearing, as heretofore, the mechanism of the present invention being employed merely to achieve the fine control.

As explained above, the transmission mechanism will clearly have other applications where a closely controlled small speed change is required, and hence it is a further object of the present invention to provide a change speed transmission mechanism in which the ratio between the speeds of a pair of shafts can be modified as required between unity and a value not deviating greatly therefrom, whether such shafts are associated with a gas meter or not, and whether the factor for which the apparatus is to be compensated is a temperature, or some other function, such as a pressure.

Three forms which the mechanism according to the invention may take are illustrated purely by way of example in the accompanying drawings, in which:

Figure 3 is a view similar to Figure 2 showing the parts in a different position;

Figure 4 is another view similar to Figures 2 and 3 showing the parts in yet another position;

Figure 5 is a view taken principally on the line V—V on Figure 4;

Figure 6 is an explanatory diagram of the mechanism of Figures 1 to 5;

Figure 7 is a fragmentary view of an alternative construction;

Figure 8 is a view on the line VIII—VIII in Figure 7;

Figure 9 is a diagram explaining the operation of the construction shown in Figures 7 and 8.

Figure 10 is a view similar to Figure 7, of a third construction;

Figure 11 is a view on the line XI—XI in Figure 10; and

Figure 12 is a diagram explaining the operation of this third mechanism.

Figures 1, 2:
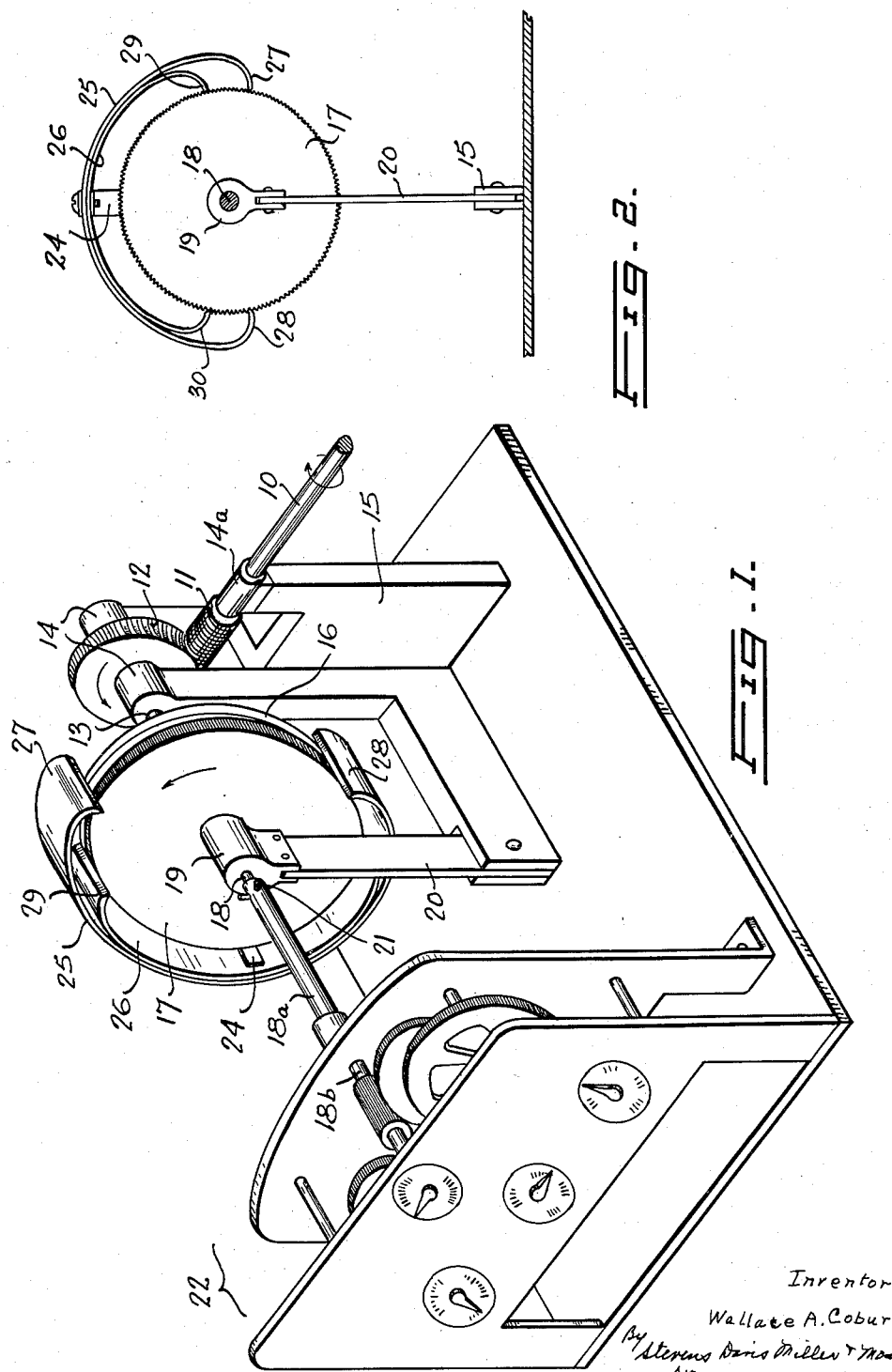
Figure 1 shows a general overall perspective view of the first form of mechanism.
Figure 2 is a fragmentary view seen in the direction indicated by the line II—II in Figure 5, but with the parts in the position of Figure 1.

Figures 1 and 5 show a first shaft 10 which is assumed to extend from a conventional volumetric measuring device, such as the bellows of a gas meter. The shaft 10 carries a worm 11 which meshes with a gear wheel 12 which is mounted on a driving shaft 13. Shaft 13 and gear wheel 12 are supported in bearings 14 mounted on upstanding frame structure 15. Bearings 14a on this same frame structure support shaft 10.

Driving shaft 13 carries a spacing wheel 16 which is arranged in a face-to-face, slightly spaced, and generally coaxial relationship with a driven toothed wheel 17 which is connected to a driven shaft 18 supported in a bearing 19 that is mounted on the free end of a bimetallic strip 20. The other end of strip 20 is rigidly fixed to the frame structure 15. Shaft 18 continues as shafts 18a and 18b through universal joints 21 to transmit rotation to a counting mechanism shown generally at 22. This mechanism 22 is conventional and serves to count the rotations of the shaft 18b and indicate the result on conventional pointer and dial indicators.

Connection between the driving shaft 13 and the driven wheel 17 is established by means of a bracket 24 rigidly secured to the spacing wheel 16, and two flexible leaf springs 25 and 26 which are clamped at their centres to the bracket 24. Springs 25 and 26 are formed at their free ends, which extends on both sides of the bracket 24, into so-called "transmission members" 27, 28, 29 and 30. By virtue of the resilience of the main portions of springs 25 and 26, these transmission members 27 to 30 are individually urged into engagement with the peripheries of the spacing and driven wheels 16 and 17, in the manner and for the purpose which will now be described.

For a given selected temperature at which unity transmission ratio is required, say 60° F., the bi-metallic strip 20 will extend straight upwardly from its connection to the frame 15 (as shown in Figure 2) and will accordingly hold the driven shaft 18 exactly coaxial with the driving shaft 13. Under these circumstances, all four of the transmission members 27 to 30 will at all times engage the peripheries of both spacing and driven wheels 16 and 17, the diameter of spacing wheel 16 being such as just to permit these transmission members to enter between the teeth of wheel 17 and hence effect a positive engagement therewith. Rotation of the shaft 13 will thus be transmitted to the shaft 18 through these transmission members.

If now the temperature to which the bimetallic strip 20 (which is assumed to be arranged to be the same as that of the gas being measured) is subjected, is lowered, strip 20 will flex and take up a position such as shown in Figures 3, 4 and 5. As a result, the shafts 13 and 18 will no longer be exactly coaxial, although they will continue to be parallel with each other.

Now consider the effect of this displacement of one shaft relative to the other in the transmission of rotary motion from the driving shaft 13 to the driven wheel 17. Assume that the parts are initially in the position shown in Figure 3 with the transmission members 27 to 30 engaging the sides of the wheels. Under these conditions, members 27 and 29 will engage only the periphery of the spacing wheel 16 which will thus perform its "spacing" function of holding these members out of engagement with the driven wheel 17. On the other hand members 28 and 30 will continue to engage the periphery of the driven wheel 17. As the driven shaft 13 is rotated anticlockwise into the position shown in Figure 4, the spreading apart of the peripheries of the driven and spacing wheels will gradually have less effect on the transmission members. The first change in circumstances will be that the member 29 will be lifted off the spacing wheel 16 by the driven wheel 17, while approximately simultaneously the member 28 will be lifted off the driven wheel 17 by the spacing wheel 16. By reason of the circumferential spread between members 27 and 29, and the corresponding spread between members 28 and 30, leading members 28 and 20 change over from engaging one wheel to engaging the other before any corresponding changeover takes place in regard to the trailing transmission members 27 and 30. As will be observed from Figure 4, these latter members are still engaging the same wheels as they engaged when the parts were in the position shown in Figure 3. However, this is a transitional condition and, as the parts continue to rotate, it is evident that the member 27 will be lifted off the spacing wheel 16 by the driven wheel 17 and correspondingly the member 30 will be lifted off the driven wheel 17 by the spacing wheel 16. When the parts have been rotated a full 180° from the position shown in Figure 3, a situation opposite but analogous to that in Figure 3 will exist with the members 27 and 29 both engaging solely the driven wheel 17 and the members 28 and 30 engaging solely the spacing wheel 16. The only other difference between this condition and that shown in Figure 3 will be that the bracket 24 will now be in its lowermost position, rather than in its uppermost position. As the apparatus continues rotating, another changeover will take place after approximately a further rotation of 90° and the parts will be back in the position shown in Figure 3 after a full 360° has been traversed.

It will be apparent that the springs 25 and 26 will be required to flex continuously as they are expanded to the shown in Figure 3 and then allowed to contract to the position shown in Figure 4. The degree of this expansion and contraction will vary with the value of the displacement between the shafts. It will therefore be necessary to form the springs 25 and 26 of an adequate material which can accept this constant flexing and yet continue always to exert a sufficient pressure on the transmission members that form the ends of the springs to ensure their positive engagement with the driven wheel 17 to transmit rotation thereto.

The effect of the manner of operation just described will be to increase the ratio of transmission between shaft 13 and shaft 18 to a value somewhat greater than unity. The reason for this will now be explained with the help of the diagram of Figure 6 which shows a pair of circles 16' and 17' representing respectively the peripheries of the spacing and driven wheels 16 and 17. It will be observed that the circle 16' has been described about a centre 13' which corresponds to the axis of the shaft 13, and that the circle 17' has been described about a centre 18' corresponding to the axis of the shaft 18. It has been assumed in Figure 6 that the axis 18' of the shaft 18 has been displaced from the axis 13' of the shaft 13 by an amount $x$.

Further assume for the purposes of the initial theoretical consideration of Figure 6, that the driving shaft 13 by the agency of its spacing wheel 16 carries a single transmission member which is initially assumed to be in the changeover position M1, that is to say in a position just beginning to engage the wheel 17. Rotation is assumed to be anticlockwise. The position M1 is generally similar to the position of the transmission member 29 in Figure 4, although the latter has advanced slightly beyond the exact changeover position. Transmission of rotation from shaft 13 to wheel 17 will now take place for approximately one-half revolution by means of this transmission member which while driven by the shaft 13 will continue to ride on the periphery of the wheel 17. About a quarter of a revolution later it will occupy the position shown at M2 in Figure 6. In this movement from position M1 to position M2 the shaft 13 will have turned through an angle $a$, since this is the angle subtended at the axis 13' by the arc between positions M1 and M2. On the other hand, during the same time the wheel 17 will have turned through an angle $b$, since this is the angle subtended at the axis 18' by the same arc between positions M1 and M2. Similarly, as the transmission member continues its travel from position M2 to position M3, the axes 13' and 18' will respectively carry out rotations equal to the angles $a$ and $b$. At position M3, this transmission member ceases to engage the wheel 17, since it is here lifted off by the spacing wheel 16. Compare the condition of member 28 in Figure 4 which has just experienced this event. From this time on, there would be no transmission of rotation between the shafts if a second transmission member did not engage the wheel 17 at position M1 to repeat the cylce just described. For the purposes of the theoretical discussion so far, it has been assumed that this re-engagement of a second transmission member occurs exactly simultaneously with the disengagement of the first transmission member. In reality this cannot be ensured for all values of $x$ with just two transmission members, which is the reason why four such members are used in practice. However, before considering this aspect of the apparatus, it is preferred to conclude the discussion of the theoretical considerations.

It has been shown that each time a transmission member connected to the driving shaft 13 engages and transmits rotation to the driven wheel 17, the driven wheel is rotated through an angle $2b$ while the driving shaft is rotated through an angle $2a$. It follows that the ratio between the speeds of rotation of the two shafts is equal to $$\frac{b}{a}$$

Since, as can clearly be seen from Figure 6, the angle $b$ is greater than the angle $a$, this ratio represents a gain in speed by the driven shaft.

It has been assumed that the diameters of the wheels 16 and 17 are equal to each other (measuring the diameter of wheel 17 to the valleys between the teeth) and this diameter will now be referred to as $d$. Consequently, the distance from the axis 13′ to the position M1 equals $$\frac{d}{2}$$

As will be seen from the geometry of Figure 6, cosine $a$ equals $\frac{x}{2}$ divided by $\frac{d}{2}$ or in other words $$\frac{x}{d}$$

Since the speed ratio between the shafts equal $$\frac{b}{a}$$

and $b$ equals $180° - a$, then $$\frac{b}{a} \text{ equals } \frac{180° - a}{a}$$

or $$\frac{180° - \cos^{-1}\frac{x}{d}}{\cos^{-1}\frac{x}{d}}$$

This latter expression is the transmission ratio. Assume, for example, that one shaft is displaced relative to the other by 10% of the diameter of the wheels. Then $$\frac{x}{d} \text{ equals } 0.1$$

$\cos^{-1} 0.1$ approximately equals $84°$, so that the ratio will equal $$\frac{180 - 84}{84}$$

or $$\frac{96}{84}$$

which is 1.14 or a 14% gain in speed. This is more than will normally be required for the temperature compensation of a gas meter.

It will be observed from Figure 6 that positions M1 and M3 are not truly diametrically opposite each other in relation to axis 13′ which is the axis to which the transmission members are fixed as far as rotation is concerned. Since the distance between positions M1 and M3 is thus different depending on which way around circle 16′ the distance is measured, and since, additionally, the amount of this difference varies with the value of $x$, it is impossible with just two transmission members to ensure that under all conditions one member will engage the wheel 17 at the exact moment that the other member is disengaged from it. It is not even possible with two transmission members to ensure some overlap between the engagement periods. It is for this reason that in the example already described four transmission members are provided arranged in pairs, one pair on each side of the wheels and the members of each pair spread apart from each other in the circumferential direction.

The use of four properly spaced transmission members ensures that two of them are always engaging the driven wheel 17 (as appears from Figures 3 and 4), but if it is sufficient to place reliance on transmission through a single transmission member, then only three transmission members need be used. The essential requirement for continuous transmission is that there must always be at least one transmission member engaging the driven wheel 17, regardless of the position of the parts. Thus, in terms of the diagram of Figure 6, it can be said that no transmission member must be further spaced from another transmission member around the axis 13′ than the angle $2a$ between positions M1 and M3. If this were not so then one transmission member would disengage at position M3 before another had engaged at position M1.

Angle $2a$ equals $2 \cos^{-1}\frac{x}{d}$

If this expression is solved for the largest ratio of $$\frac{x}{d}$$

for which the apparatus is designed, then the minimum value of angle $2a$ is determined. If, taking the previous example, the maximum designed value of $$\frac{x}{d}$$

is assumed to be 0.1, then $a$ equals $84°$ and $2a$ equals $168°$. The requirement that no angle between any pair of transmission members be greater than $168°$ can never be satisfied with two transmission members but can readily be satisfied with three. Such transmission members could be arranged two comparatively close together on one side of the wheels and one on the other side (for example with angles between transmission members of $165°$, $30°$ and $165°$), or preferably more symmetrically arranged with $120°$ between each pair of transmission members. Even if the maximum value of the ratio $$\frac{x}{d}$$

could, having regard to mechanical considerations, be increased as high as 0.2, then the maximum permissible value for the angles between transmission members would only be lowered from $168°$ to $157°$, which is well above the value of $120°$ which a symmetrical arrangement of three transmission members yields.

Such an arrangement is shown as an alternative embodiment in Figures 7 and 8. Figure 7 shows a view from the rear of a modified form of spacing wheel 16a carrying three transmission members 31, 32 and 33 each slidably mounted in a bracket 34 secured to the wheel 16a and each urged radially inwardly by a spring 35, the limit of travel being determined as before by the spacing wheel 16a. Figure 8 shows a fragmentary view on the line VIII—VIII in Figure 7 and demonstrates how a turned-over portion of transmission member 31 (transmission members 32 and 33 are similar) engages, by means of a tooth 36 on member 31, the periphery of driven wheel 17a to transmit rotation thereto. A pin 37 projecting from each transmission member 31, 32, 33 slides in slot 38 in bracket 34 to prevent the transmission member twisting.

Figure 9 is a diagram somewhat similar to Figure 6, but instead showing positions P1, P2 and P3 that transmission members 31, 32 and 33 will respectively occupy when transmission member 31 is just engaging driven wheel 17a at position P1. It will be evident that, regardless of which position the parts are turned into, there will always be one transmission member engaging the driven wheel 17a and sometimes two.

Even when four transmission members are used, in order always to have two transmission members engaging the driven wheel at any given time, the same basic criterion must be satisfied that no angle between any two adjacent transmission members should exceed $$2 \cos^{-1}\frac{x}{d}$$

solved for the maximum design value of the ratio $$\frac{x}{d}$$

(unless, of course, discontinuous transmission can be tolerated).

To ensure a positive grip between the transmission members and the driven wheel 17 shown in Figures 1 to 5, the wheel 17 is provided with teeth, and, of course, the fineness of gradation of speed ratio control that can be obtained will depend upon the number of teeth and hence their closeness of spacing. If some risk of slipping can be accepted, or, if the materials involved in construction the transmission members and the periphery of the driven wheel 17 are sufficiently reliable to ensure no significant slip between these parts, the periphery of the wheel 17 can be made smooth and the teeth dispensed with, in which case an infinitely fine gradation of speed ratios is obtainable. The embodiment of Figures 7 and 8 shows such a smooth wheel 17a, the transmission members 31 to 33 each bearing the tooth 36 which penetrates and grips the periphery of the wheel 17a, which in this case will be made of some suitably tough and resilient material such as a hard rubber.

In the examples described so far the spacing wheel 16 has been made in the form of a wheel for convenience of securing the brackets 24 and 34 thereto, as well as to provide peripheral surfaces for engagement by the various transmission members 27 to 33. It should, however, be appreciated that, unlike the driven wheel 17, the spacing means need not necessarily be a wheel. The portions of the wheel 16 that the transmission members 27 to 33 respectively engage do not change, since the circumferential positions of members 27 to 33 is fixed in relation to this wheel and its driving shaft 13. Consequently, separate stops mounted in radially projecting positions on the shaft 13 would be equally effective in holding the transmission members out of contact with the driven wheel 17. The important requirement is that the spacing means, whether it be a wheel or individual stops, should define a limit of travel for each of the transmission members in the direction in which such members are urged by the urging means, the latter, in the first example being the springs 25 and 26 the ends of which form the transmission members, and, in the second example, the springs 35.

In the examples illustrated up to Figure 9, the urging means act radially inwardly and hence the spacing means must define the limit of travel of the transmission members in this inward radial direction. It would be possible, as an alternative, for the transmission members to be urged radially outwardly against an inwardly facing peripheral surface of the driven wheel, in which case the spacing means would require to limit the outward travel of such transmission members. The transmission ratio obtained would then be less than unity in accordance with the same formula as set out above. This is demonstrated in Figures 10 to 12. Figures 10 and 11 show a further modified spacing wheel 16b carrying three brackets 34 supporting transmission members 31b, 32b and 33b which are urged radially outwardly by springs 35, the "spacing" function being now performed by stops 40 mounted on wheel 16b. Teeth 36 on members 31b, 32b and 33b engage an inner periphery surface 39 of an annular lip 41 formed on modified driven wheel 17b. Figure 12, which is generally similar to Figure 6 except that it shows the parts from the driving side as seen in Figure 10 (circle 16' now representing the locus of the tips of teeth 36 in the fully extended position of transmission members 31b, 32b and 33b), shows how the angle 2c through which axis 13' of driving shaft 13 turns in travel of a transmission member from point M4 to M5 is greater than angle 2d through which axis 18' of driven shaft 18 turns. This demonstrates that the speed ratio is less than unity. The positions P4, P5 and P6 are those occupied respectively by transmission members 31b, 32b and 33b in Figure 10.

In all examples of the invention the limit of travel defined by the spacing means must be such that the radial distance of such limit from the driving shaft for each of the transmission members is approximately equal to the radial distance from the driven shaft to the peripheral surface to which such driven shaft is connected. This requirement is readily apparent in the example illustrated in Figures 1 to 5 by virtue of the equality of the diameters of wheels 16 and 17. The same effect is achieved in the examples in the other figures, although the structure of wheels 16a, 17a, 16b and 17b is more complex.

If the effective diameters of wheels 16 and 17 were made slightly unequal, the apparatus would operate effectively only under certain conditions. If wheel 16 were made smaller than wheel 17, the transmission ratio would remain at unity during initial displacement of one shaft relative to the other, until the displacement became equal to the difference between the wheel radii, after which further displacement would produce some speed gain, although in accordance with a more complex expression than derived above. On the other hand, if wheel 16 were bigger than wheel 17, no rotation would be transmitted at all when the shafts were coaxial. Once they had been displaced an amount equal to the difference between the radii, the transmission members would begin to engage their cooperating driven peripheral surface over short arcs of travel. A form of intermittent drive would result. There might be some particular circumstances in which these unusual characteristics would be desirable, but it is generally true to say that, for all normal operation, the travel limit defined by the spacing means must be substantially equal to the radius of the peripheral surface with which the transmission members engage.

It will be observed that the effect of the present mechanism is always to produce the same sign of speed change regardless of the direction of shaft displacement. In the embodiments of Figures 1 to 9 this is a speed gain (except in the special circumstances previously mentioned where an intermittent drive is obtained by the wheel 16 being of greater diameter than wheel 17, or an angle between a pair of transmission members exceeding the maximum value calculated as explained above). This effect of speed gain is obtained no matter which way from its coaxial location the shaft 18 is displaced. If a speed reduction is required then the apparatus must either be operated in reverse with the driven wheel 17 transmitting rotation through transmission members 27 to 30 to the driving shaft 13 or the transmission members must be urged outwardly against an inwardly facing driven peripheral surface, in the manner of Figures 10 and 11. If this is done the effect will again always be a speed reduction. In other words, once the apparatus has been constructed to obtain either a gain or a loss, it will continue always to yield the chosen gain or loss regardless of which way one shaft is displaced from the other.

If the direction of drive is reversed the "driving" and

"driven" nature of the parts will be reversed. For the sake of simplicity of nomenclature, the terms "driving" and "driven" have been retained in certain of the following claims; it should, however, be understood that these are merely convenient descriptions and are not intended to exclude operation in reverse when the functions of the parts will be interchanged.

In the foregoing example 60° F. has been taken as the base temperature, as this is common practice in gas metering calculations. However, should the temperature rise above 60° F., and the bimetallic strip 20 flex to the right as seen in Figure 2, the resulting displacement of the shaft 18 will, as explained above, give rise to a speed increase. This would be erroneous. Such action can be prevented by providing a stop to check movement of shaft 18 to the right beyond the central coaxial position. Alternatively, the disadvantage of false readings about 60° F. could be avoided by choosing a higher base temperature, say 80° F., for unity transmission ratio. The conventional temperature of 60° F. could still be taken as the base temperature for metering calculations, although the transmission ratio would not be unity at this base temperature. The transmission ratio would nevertheless be the same at all times for a 60° F. gas temperature, and the deviation of this ratio from unity could be compensated for in the remainder of the gearing. Such an arrangement would then have the advantage of being able to meter accurately at temperatures in excess of 60° F.

As a further alternative, two mechanisms operating in accordance with the present invention could be arranged in series (one constructed as in the examples illustrated in Figures 1 to 9, and the second constructed as in the example of Figures 10 to 12 or as in the examples of Figures 1 to 9 with the driving and driven shafts reversed). The first mechanism would yield a speed gain and could be rendered ineffectual above say 60° F. by a stop, while the second mechanism would yield a speed reduction and could be rendered ineffectual below 60° F. by a stop. This would enable the whole range to be covered accurately while still retaining 60° F. as the base temperature for calculations and at which unity transmission ratio is employed.

In the foregoing examples, the means for displacing one of the shafts relative to the other comprises the bimetallic strip. It is to be understood that in some other applications of the invention such means may constitute any desired instrumentality that is capable of effecting such displacement in response to an applied stimulus. Such stimulus might be another physical variable, such as a pressure, or may simply comprise a manual movement by an operator. As a further alternative, such stimulus may derive from a load sensitive mechanism. For example, the drive of the present invention could be employed in a meter (such as an electricity meter) which is required to impose a penalty for exceeding a predetermined maximum demand. Whenever such demand were exceeded, the shafts of a transmission according to the present invention would be displaced so that the meter would read high. In this way, although the meter would not read accurately in physical units (kilowatt-hours or cubic feet or as the case may be), it would read accurately in charge to the consumer.

I claim:

1. A speed change transmission mechanism comprising a pair of shafts between which rotation is to be transmitted, means mounting said shafts generally coaxially with each other, said mounting means including means for displacing one of said shafts relative to the other in a direction generally transverse to their axes while maintaining said axes generally parallel to each other, a member connected to a first one of said shafts and defining a peripheral surface concentric with said first shaft, at least three transmission members mounted to rotate with the other said shaft, said transmission members being circumferentially spaced apart from each other, means urging said transmission members into rotation transmitting engagement with said surface, and spacing means defining a limit of travel for each of said transmission members in the direction that such member is urged by said urging means, the distance of each said limit of travel from said other shaft being substantially equal to the radius of said peripheral surface about said first shaft.

2. A mechanism according to claim 1, wherein said transmitting members are so spaced apart from each other that every adjacent pair of said members subtends an angle at the centre of said other shaft not greater than $$2\cos^{-1}\frac{x}{d}$$

where $x$ is the maximum relative displacement of said shafts and $d$ is the diameter of said peripheral surface.

3. A mechanism according to claim 1, wherein said urging means urge said transmission members in a radially inward direction in relation to said other shaft, and said spacing means limit the radially inward travel of said transmission members.

4. A mechanism according to claim 3 wherein said spacing means comprise a spacing wheel mounted on said other shaft, the diameter of said spacing wheel being substantially equal to the diameter of said peripheral surface.

5. A mechanism according to claim 1, wherein said urging means urge said transmission members in a radially outward direction in relation to said other shaft, and said spacing means limit the radially outward travel of said transmission members.

6. A mechanism according to claim 1, wherein said peripheral surface is indented to provide positive location and engagement between said surface and said transmission members.

7. A mechanism according to claim 1, wherein said peripheral surface is smooth and is formed of resilient material.

8. A mechanism according to claim 1, wherein said means for displacing one shaft relative to the other includes temperature sensitive means for effecting said displacement as a function of temperature.

9. A mechanism according to claim 8, in combination with a gas meter, said mechanism being interposed in the drive to the counter of the meter and said temperature sensitive means being subjected to the temperature of the gas being measured.

10. A speed change transmission mechanism comprising a pair of shafts between which rotation is to be transmitted, means mounting said shafts generally coaxially with each other, said mounting means including means for displacing one of said shafts relative to the other in a direction transverse to their axes while maintaining said axes generally parallel to each other, a member connected to a first one of said shafts and defining a peripheral surface concentric with said first shaft, two pairs of transmission members mounted to rotate with the other said shaft, one said pair of transmission members being disposed generally diagonally opposite said other pair and the members of each pair being circumferentially spaced apart from each other, means urging said transmission members into rotation transmitting engagement with said surface, and spacing means defining a limit of travel for each of said transmission members in the direction that such member is urged by said urging means, the distance of each said limit of travel from said other shaft being substantially equal to the radius of said peripheral surface about said first shaft.

11. A mechanism according to claim 10, wherein said transmitting members are so spaced apart from each other that every adjacent pair of said members subtends an angle at the centre of said other shaft not greater than $$2 \cos^{-1}\frac{x}{d}$$

where $x$ is the maximum relative displacement of said shafts and $d$ is the diameter of said peripheral surface.

12. A speed change transmission mechanism comprising a driving shaft, a driven shaft arranged generally coaxially with said driving shaft, means for displacing one of said shafts relative to the other in a direction transverse to their axes while maintaining said axes generally parallel to each other, a driven wheel secured to said driven shaft, two pairs of transmission members secured to said driving shaft to rotate therewith, one said pair of transmission members being disposed generally diagonally opposite said other pair and the members of each pair being circumferentially spaced apart from each other, means urging said transmission members radially into rotation transmitting engagement with a peripheral surface of said driven wheel whereby to interconnect said driving and driven shafts, and spacing means defining a limit of travel for each of said transmission members in the direction that such member is urged by said urging means, the distance of each said limit of travel from said driving shaft being substantially equal to the radial distance between said driven shaft and said peripheral surface.

13. A mechanism according to claim 12, wherein said transmitting members are so spaced apart from each other that every adjacent pair of said members subtends an angle at the centre of said driving shaft not greater than $$2 \cos^{-1}\frac{x}{d}$$

where $x$ is the maximum relative displacement of said shafts and $d$ is the diameter of said peripheral surface.

References Cited in the file of this patent

UNITED STATES PATENTS

| | | |
|---|---|---|
| 1,177,853 | Frey | Apr. 4, 1916 |
| 1,185,887 | Douglas | June 6, 1916 |
| 1,437,779 | Shaffer | Dec. 5, 1922 |
| 1,508,220 | Frey | Sept. 9, 1924 |